United States Patent
Linderman (10) Patent No.: US 10,461,530 B2
(45) Date of Patent: Oct. 29, 2019

(54) APPARATUS AND SYSTEM FOR COUPLING POWER ELECTRONICS TO A PHOTOVOLTAIC MODULE

(71) Applicant: Enphase Energy, Inc., Petaluma, CA (US)

(72) Inventor: Ryan Linderman, Oakland, CA (US)

(73) Assignee: Enphase Energy, Inc., Petaluma, CA (US)

(*) Notice: Subject to any disclaimer, the term of this patent is extended or adjusted under 35 U.S.C. 154(b) by 809 days.

(21) Appl. No.: 14/793,164

(22) Filed: Jul. 7, 2015

(65) Prior Publication Data

US 2016/0013642 A1    Jan. 14, 2016

Related U.S. Application Data

(60) Provisional application No. 62/022,307, filed on Jul. 9, 2014.

(51) Int. Cl.
| | |
|---|---|
| *H02J 1/00* | (2006.01) |
| *H02J 3/00* | (2006.01) |
| *H02M 3/04* | (2006.01) |
| *H02M 7/44* | (2006.01) |
| *H02M 7/00* | (2006.01) |

(52) U.S. Cl.
CPC .............. *H02J 1/00* (2013.01); *H02M 3/04* (2013.01); *H02M 7/003* (2013.01); *H02M 7/44* (2013.01); *Y02E 10/56* (2013.01)

(58) Field of Classification Search
CPC ............ H02J 1/00; H02M 7/003; H02M 3/04; H02M 7/44; Y02E 10/56

USPC .............................................. 307/78
See application file for complete search history.

(56) References Cited

U.S. PATENT DOCUMENTS

| | | | |
|---|---|---|---|
| 8,106,537 B2 | 1/2012 | Casey et al. | |
| 8,422,249 B2 | 4/2013 | Cooper et al. | |
| 8,455,752 B2 | 6/2013 | Korman et al. | |
| 8,467,200 B2 | 6/2013 | Pan et al. | |
| 8,586,855 B2* | 11/2013 | Park | H01L 31/02168 136/244 |
| 9,225,286 B1* | 12/2015 | Tweedie | H02M 1/00 |
| 2010/0263704 A1 | 10/2010 | Fornage et al. | |
| 2011/0220180 A1 | 9/2011 | Cinnamon et al. | |
| 2012/0033466 A1 | 2/2012 | Moussaoui | |
| 2012/0042925 A1 | 2/2012 | Pfennig | |

(Continued)

FOREIGN PATENT DOCUMENTS

WO    WO-2010144637 A1    12/2010

OTHER PUBLICATIONS

Enphase Energy, "Installing Enphase Microinverters At Sites With Building Integrated Photovoltaic (BIPV) Overview".

(Continued)

*Primary Examiner* — Richard Tan
(74) *Attorney, Agent, or Firm* — Moser Taboada (57) ABSTRACT

An apparatus and system for presenting a power output from a photovoltaic (PV) module. In one embodiment, the apparatus comprises a connector assembly comprising (i) an encapsulated ribbon egress, integrated with the PV module, comprising a plurality of PV module substring interconnects electrically coupled to a plurality of PV cells of the PV module; and (ii) a connector comprising a two-pole DC electrical output that is electrically coupled to the plurality of PV module substring interconnects.

20 Claims, 7 Drawing Sheets

(56) References Cited

U.S. PATENT DOCUMENTS

| | | | | |
|---|---|---|---|---|
| 2012/0060895 | A1* | 3/2012 | Rubin | H01L 31/048 |
| | | | | 136/246 |
| 2012/0248594 | A1* | 10/2012 | Lee | H01L 23/291 |
| | | | | 257/693 |
| 2013/0146125 | A1 | 6/2013 | Meyers et al. | |
| 2013/0188396 | A1 | 7/2013 | Saussele | |
| 2013/0340804 | A1 | 12/2013 | Moon et al. | |
| 2014/0352753 | A1* | 12/2014 | Degroot | H01L 31/0504 |
| | | | | 136/244 |
| 2015/0013753 | A1* | 1/2015 | Nanjundiah | B32B 17/10018 |
| | | | | 136/251 |
| 2015/0101653 | A1* | 4/2015 | Cioffi | H02S 20/00 |
| | | | | 136/251 |
| 2016/0118933 | A1* | 4/2016 | Russell | H02S 40/32 |
| | | | | 136/251 |
| 2016/0372929 | A1* | 12/2016 | Ishikawa | H02S 40/34 |

OTHER PUBLICATIONS

Enphase Energy, "Mating Microinverters with PV Modules for Correct Polarity", Dec. 5, 2012.
Altenergy Power System, Inc., "Mating APS Microinverters With PV Modules Using DC Connector", 2013.
International Search Report dated Oct. 21, 2015 for PCT Application No. PCT/US2015/039358.

* cited by examiner

APPARATUS AND SYSTEM FOR COUPLING POWER ELECTRONICS TO A PHOTOVOLTAIC MODULE

CROSS-REFERENCE TO RELATED APPLICATIONS

This application claims benefit of U.S. provisional patent application Ser. No. 62/022,307, entitled "Photovoltaic Module with Integrated Power Electronics" and filed Jul. 9, 2014, which is herein incorporated in its entirety by reference.

BACKGROUND OF THE INVENTION

Field of the Invention

In one type of renewable energy system, photovoltaic (PV) modules are arranged in an array where each module is coupled one-to-one to a power conditioning unit, such as a DC optimizer or a DC-AC inverter. For systems utilizing DC-AC inverters that are operated to convert DC input power to AC output power, the AC output energy is collected from each inverter using an AC cable that couples each inverter to its neighboring inverter, and the AC cable is generally terminated in a junction box to couple the generated AC energy to the power grid.

Conventionally, the electrical interconnection between a PV module and the corresponding power conditioning unit utilizes a DC junction box coupled to the PV module and single-pole DC cabling/connectors, such as single-pole multi-contact (MC) cabling/connectors, for coupling the generated DC power from the PV module to the power conditioning unit. Such interconnection components increase both labor and financial costs for the system. For example, DC junction boxes must be placed on and secured by an adhesive to each PV module, and DC cable connections must be manually made between each DC junction box and the corresponding power conditioning unit. Additionally, the power conditioning units must be mechanically mounted to the PV modules using techniques that generally involve additional components and labor, such as screwing the power conditioning unit to a PV module bracket.

Therefore, there is a need in the art for apparatus to efficiently mechanically couple and electrically couple a power conditioning unit to a PV module.

SUMMARY OF THE INVENTION

Embodiments of the present invention generally relate to a system and apparatus for coupling power from a photovoltaic (PV) module substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to an electrical and thermo-mechanical interconnection system for electrically and mechanically coupling a power conditioning unit (PCU), such as a DC-AC microinverter or a DC optimizer, to a photovoltaic (PV) module. In some embodiments, a snap-in-place mechanical fixture mechanically couples a PCU to the back surface of a PV module with a defined gap for thermal management and a novel PV module connector integrates sub-string bypass circuitry, thereby removing the need for a PV module mounted junction box, DC cabling and MC connectors. The interconnection system allows for the power electronics to be disconnected from the PV module for service and additionally provides a low profile shipping configuration without the power electronics installed. Further, the interconnection system decouples the electrical and the mechanical connectivity between the PV module/PCU to provide a robust electrical contact between the PV module/PCU that is resistant to stress that may otherwise be incurred at the electrical interconnection between a PV module and a PCU (e.g., due to jostling of the connected PCU).

Figure 1:
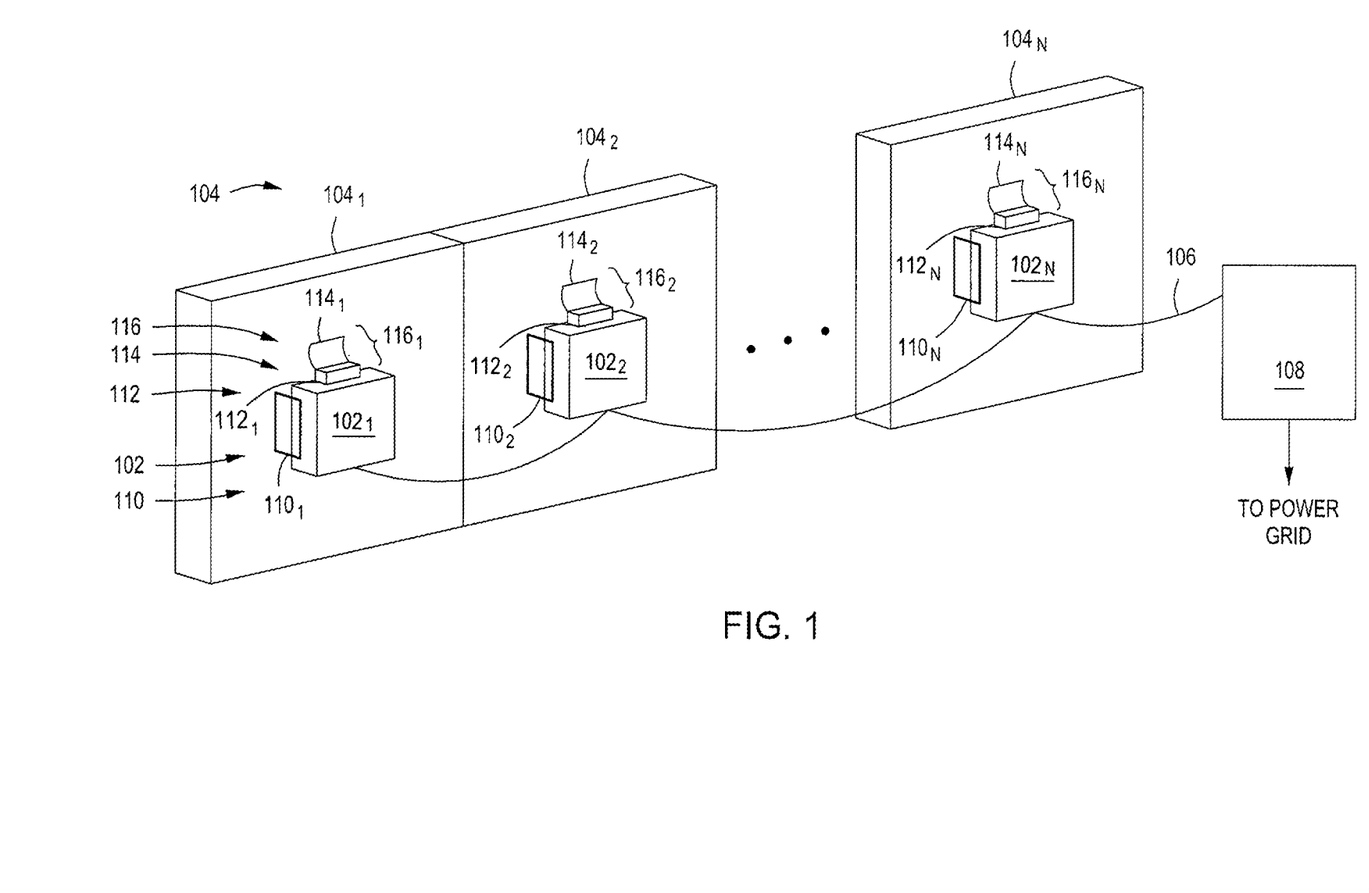
FIG. 1 is a block diagram depicting a physical layout of a photovoltaic (PV) system in accordance with one or more embodiments of the present invention.

FIG. 1 is a block diagram depicting a physical layout of a photovoltaic (PV) system 100 in accordance with one or more embodiments of the present invention.

The PV system 100 comprises a plurality of power conditioning units (PCUs) $102_1$, $102_2$ ... $102_n$ (collectively PCUs 102), a plurality of PV modules $104_1$, $104_2$ ... $104_n$ (collectively PV modules 104), and a plurality of mounting rail pairs $110_1$, $110_2$ ... $110_n$ (collectively mounting rails or mounting rail pairs 110). Each PCU $102_1$, $102_2$ ... $102_n$ is mechanically coupled to a corresponding PV module $104_1$, $104_2$ ... $104_n$ via a mounting rail pair $110_1$, $110_2$ ... $110_n$, respectively, in a one-to-one correspondence. Each mounting rail pair 110 is formed from a non-electrically conductive (i.e., insulating) material, such as polycarbonate (PC), p-phenylene oxide (PPO™)+polystyrene (PS), p-phenylene ether (PPE), NORYL™, LEXAN™, or the like, and is adhered to the rear face of the corresponding PV module 104 (i.e., on the side of the PV module 104 not exposed to sunlight). The mounting rails 110 retain the corresponding PCUs 102 proximate the PV modules 104 with a defined gap between the PCU 102 and the PV module 104 that allows airflow between the components for thermal management. In some embodiments, the gap may be on the order of 5-25 mm and may depend on topology features of the PCU enclosure.

In addition to being mechanically mounted to the PV modules 104, the PCUs $102_1$, $102_2$ ... $102_n$ are electrically coupled to the PV modules $104_1$, $104_2$ ... $104_n$ by connector assemblies $116_1$, $116_2$ ... $116_n$ (collectively connector assemblies 116), respectively. Each connector assembly 116 comprises an encapsulated ribbon egress 114 coupled to a connector 112 (i.e., the connector assembly $116_1$ comprises the encapsulated ribbon egress $114_1$ coupled to the connector $112_1$, the connector assembly $116_2$ comprises the encapsulated ribbon egress $114_2$ coupled to the connector $112_2$, and the connector assembly $116_n$ comprises the encapsulated ribbon egress $114_n$ coupled to the connector $112_n$). Each connector assembly 116 couples the generated DC power from the corresponding PV module 104 to the PCU 102 via a two-pole DC connection as described in detail further below with respect to FIGS. 2-4.

In some embodiments, such as the embodiment depicted in FIG. 1, the PCUs 102 are DC-AC inverters for inverting DC power generated by the PV modules 104 to AC power. In such embodiments, the PCUs 102 are coupled to a load center 108 via an AC bus 106 for distributing the AC output produced by the PCUs 102. The load center 108 may house connections between an AC commercial power grid distribution system and the AC bus 106 for coupling the generated AC power to the grid. Additionally or alternatively, the generated AC power may be coupled to commercial and/or residential systems via the load center 108, as well as stored for later use (for example, the generated energy may be stored utilizing batteries, heated water, hydro pumping, $H_2O$-to-hydrogen conversion, or the like).

In other embodiments, the PCUs 102 may be other types of power conditioning units; for example, the PCUs 102 may be DC-DC converters and the bus 106 may carry DC energy to a DC power distribution system and/or to a single centralized DC-AC inverter. The generated DC power may additionally or alternatively be supplied directly to commercial and/or residential systems via the load center 108, as well as stored for later use (for example, the generated energy may be stored utilizing batteries, heated water, hydro pumping, $H_2O$-to-hydrogen conversion, or the like).

Figure 2:
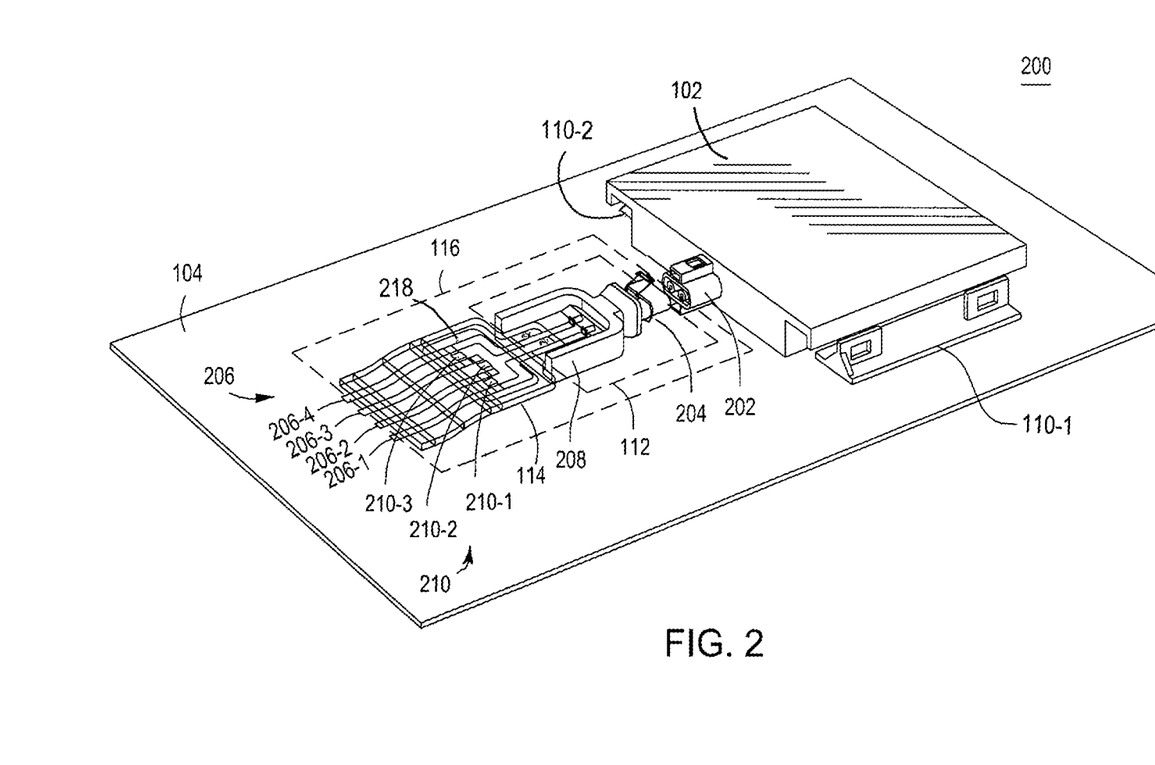
FIG. 2 is an angled perspective view of a connector assembly and a power conditioning unit (PCU), each coupled to a PV module, in accordance with one or more embodiments of the present invention.

FIG. 2 is an angled perspective view of a connector assembly 116 and a PCU 102, each coupled to a PV module 104, in accordance with one or more embodiments of the present invention. As shown in FIG. 2, the exterior of the encapsulated ribbon egress 114 and the top portion of the connector 112 are depicted as transparent in order to more clearly show the internal circuitry for these components.

The connector assembly 116 comprises the encapsulated ribbon egress 114 for coupling the DC output from the PV module to the connector 112. The encapsulated ribbon egress 114 comprises electrically conductive (e.g., copper) PV module substring interconnects 206-1, 206-2, 206-3, and 206-4 (collectively PV module substring interconnects 206 or PV substring interconnects 206) that are coupled to the PV module substring bus ribbons to provide an external current path from the PV module 104 and carry the electric power generated by the PV module cells. In order to prevent reverse-current damage to the PV module cells, a first bypass diode 210-1 is coupled between the PV substring interconnects 206-1 and 206-2, a second bypass diode 210-2 is coupled between the PV substring interconnects 206-2 and 206-3, and a third bypass diode 210-3 is coupled between the PV substring interconnects 206-3 and 206-4. Although four PV module substring interconnects 206 and three bypass diodes 210 are shown in FIG. 2, other embodiments may comprise a different number of PV module substring interconnects 206/bypass diodes 210. In other embodiments, a different number of PV substring interconnects 206 and bypass diodes 210 may be present. Generally any number "M" PV substring interconnects 206 may be present with "M−1" corresponding bypass diodes 112, although certain embodiments may comprise two substring interconnects 206 and no bypass diodes.

The encapsulated ribbon egress 114 further comprises a heat spreader 218 proximate the PV substring interconnects 206 and the bypass diodes 210 to dissipate heat generated by the bypass diodes 210. The heat spreader 218 may be formed from any suitable thermally conductive material, such as aluminum, copper or other metals with high thermal conductivity, and is isolated from the PV substring interconnects 206/bypass diodes 210 by a thin strip of material that electrically isolates the heat spreader 318 from the PV substring interconnects 206/bypass diodes 210 (e.g., a backsheet or other insulating polymer, a layer of encapsulation material, an adhesive, or the like). In some embodiments, metal foils may be laminated with the bypass diodes 210 to provide enhanced thermal management. In some other embodiments, such as the embodiment described below with respect to FIG. 4, the bypass diodes 210 and the heat spreader 218 may be located within the connector 112 rather than within the encapsulated ribbon egress 114. In still other embodiments, a conventional junction box may be adapted to comprise the bypass diodes 210 and the heat spreader 218 and to have a two-pole DC connector plug, for example via a two-pole DC cable, for coupling the generated DC power from the PV module 104 to the PCU 102. In yet other embodiments, the bypass diodes 210 and the heat spreader 218 may be located within the PCU 102. In certain embodiments, control electronics of the PCU 102 can protect the PV module cells in the event of shading to completely remove the need for the bypass diodes 210 and the corresponding heat spreader 218 (i.e., the control electronics detect and limit the current in the module such that the system is protected from the effects of cell shading).

The PV substring interconnects 206-1 and 206-4 extend past the heat spreader 218 and out through an end of the encapsulated ribbon egress 114 and are coupled to the connector 112 as described in more detail below with respect to FIG. 3.

The connector 112 is formed from a rigid non-conductive material (such as PC, PPO™+PS, PPE, NORYL™, LEXAN™, or the like, and comprises a connector body 208 that terminates on one end in a connector plug 204 for presenting the generated DC current. The connector plug 204 is a two-pole DC connector plug sized and shaped for mating with a DC input receptacle 202 of the PCU 102 to provide the DC output power from the PV module 104 to the PCU 102. In some alternative embodiments, an adapter may be used to couple the two-pole DC connector plug 204 to a conventional string of PV modules.

The PCU 102 is coupled to the PV module 104 via the mounting rails 110 (i.e., mounting rail 110-1 and mounting rail 110-2). The mounting rails 110 are non-electrically conductive (e.g., PC, PPO™+PS, PPE, NORYL™, LEXAN™, or the like, locking rails coupled to the back surface of the PV module 104; e.g., following PV module lamination the mounting rails 110 may be glued to the rear PV module surface using an adhesive (such as an adhesive similar to those used to attach conventional junction boxes and frames to PV modules). As opposed to a conventional junction box, the mounting rails 110 do not require sealing and have no hi-pot risk since the rails are non-conductive and serve no electrical enclosure purposes. The mounting rails 110 allow the PCU 102 to be slid into position close to the connector 112 and comprise one or more elastic integral snap-fit features that function as catch-latch mechanical locking mechanisms for locking the PCU 102 in place, such as one or more receptacles or windows to engage one or more plastic spring tabs molded into the PCU enclosure (one example is described below with respect to FIG. 6). When the PCU 102 is not present, the profile of the PV module 104 with the attached mounting rails 110 remains low (i.e., substantially similar to the profile of the PV module 104 alone), thereby allowing dense packing of PV module/mounting rail assemblies for shipping.

The connector assembly 116 and the mounting rails 110 provide an electrical and thermo-mechanical interconnection system that decouples the electrical and the mechanical connectivity between the PV module 104/PCU 102; as a result of the PCU 102 being electrically connected to the PV module 104 via the flexibly-rigid encapsulated ribbon egress 114, the electrical contacts between the PV module 104/PCU 102 are more immune to stresses incurred, for example, when the PCU 102 is touched or jostled (e.g., by wind) then when the PCU 102 is electrically connected to the PV module 104 by a rigid connector.

Figure 3:
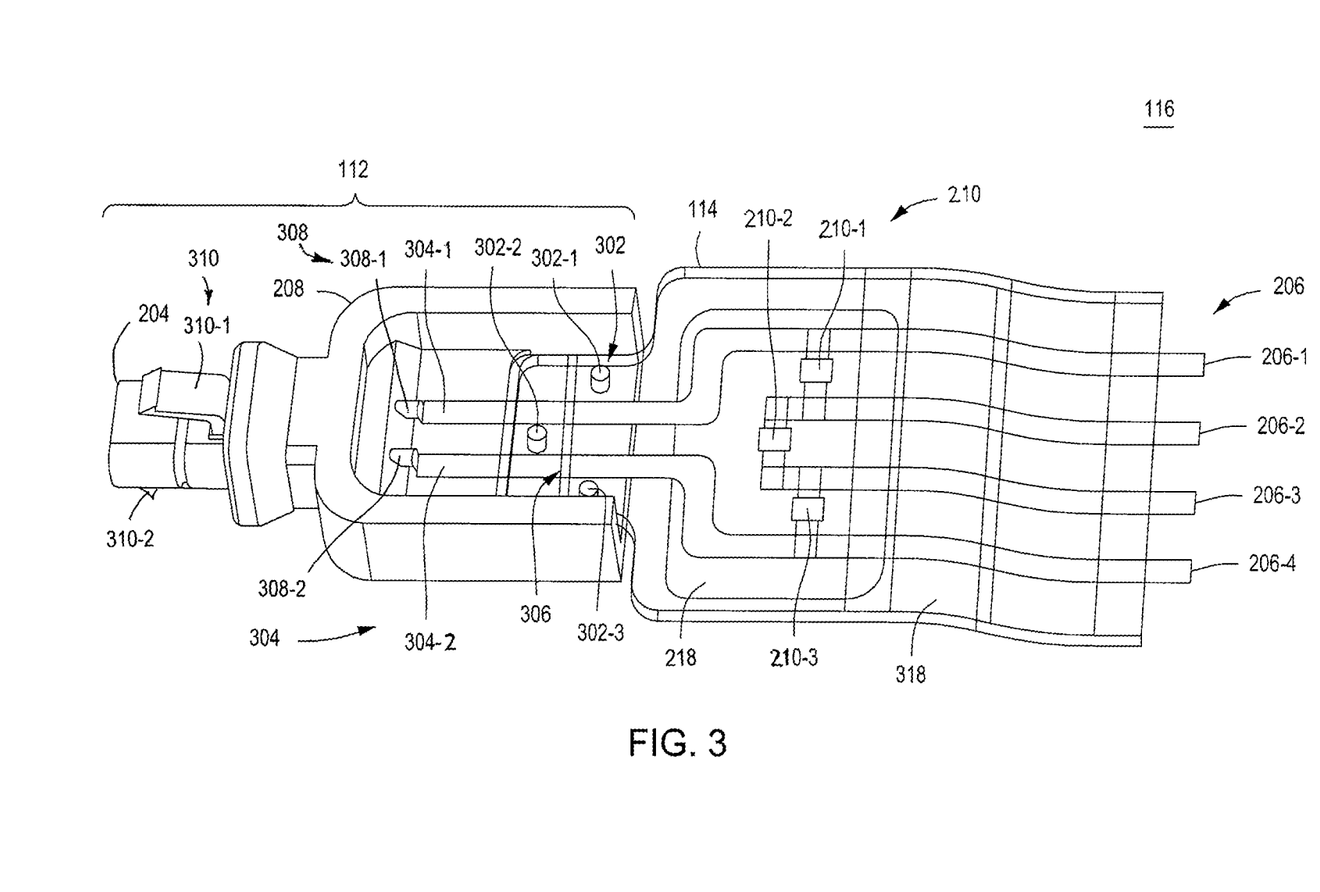
FIG. 3 is a top angled perspective view of a connector assembly in accordance with one or more embodiments of the present invention.

FIG. 3 is a top angled perspective view of a connector assembly 116 in accordance with one or more embodiments of the present invention. As shown in FIG. 3, the exterior of the encapsulated ribbon egress 114 and the top portion of the connector body 208 are depicted as transparent in order to more clearly show the internal circuitry for these components.

As described above, the encapsulated ribbon egress 114 comprises the PV substring interconnects 206, the bypass diodes 210 and the heat spreader 218. The PV substring interconnects 206-1 and 206-4 extend past the heat spreader 218 and out through an end of the encapsulated ribbon egress 114 and are coupled to the connector 112 within the connector body 208.

In some embodiments, the encapsulated ribbon egress 114 may be pre-assembled with the PV substring interconnects 206, the bypass diodes 210, and heat spreader 218 before integration with the PV module 104 during the PV module layup process (i.e., before lamination). In such embodiments, the PV substring interconnects 206 are welded to the corresponding PV module substring bus ribbons and the encapsulation and backsheet layers are placed into position. After lamination, the encapsulated ribbon egress 114 may have alignment features punched into the laminate to facilitate manufacturing and to increase mechanical pull strength of the final product.

The connector body 208 comprises alignment posts 302-1, 302-2, and 302-3 (collectively alignment posts 302) that mate with corresponding holes within the portion of the encapsulated ribbon egress 114 disposed within the connector body 208. The alignment posts 302 enable the encapsulated ribbon egress to be properly aligned and further increase mechanical pull strength of the connector assembly 116. Although three alignment posts 302 are shown, any suitable number of alignment posts 302 and/or other alignment features may be used.

The PV substring interconnects 206-1 and 206-4 extending from the end of the encapsulated ribbon egress 114 are electrically coupled (e.g., by welding, crimp-connection, or the like) to ribbon welding pads 304-1 and 304-2, respectively, in a body cavity within the connector body 208. In some embodiments an adhesive may be dispensed below the PV substring interconnects 206-1 and 206-4 and/or below the end of the encapsulated ribbon egress 114 before they are placed into the connector body 208 in order to seal the lower interface; for example, the adhesive may be dispensed within an adhesive channel 306 of the connector body 208 and the end of the encapsulated ribbon egress 114 is then laid over the channel 306. An adhesive or other type of potting material may further be dispensed over the top surface of the PV substring interconnects 206-1 and 206-4/end of the encapsulated ribbon egress 114 within the connector body cavity. A connector body cover (not shown), such as a plastic cover, may then be placed over the connector body cavity to fully seal the PV substring interconnects 206-1 and 206-4 from external contact and moisture.

The PV substring interconnects 206-1 and 206-4 are electrically coupled via the ribbons welding pads 304-1 and 304-2 to plug pins 308-1 and 308-2, respectively, although in other embodiments the PV substring interconnects 206-1 and 206-4 may be directly electrically coupled to the plug pins 308 by any suitable technique (welding, crimping, or the like). The plug pins 308-1 and 308-2 (collectively plug pins 308) are electrically conductive pins that extend through the body of the connector plug 204 for providing the DC output power to the PCU 102 when the connector plug 204 is mated with the PCU DC input receptacle 202. The plug 204 may comprise one or more mechanical snap-fit locking features, such as flexible latching clips 310-1 and 310-2 disposed on the top and the bottom, respectively, of the plug 204, that mate with corresponding mechanical locking features on the PCU DC input receptacle 202 for removably locking the plug 204 in place with the PCU DC input receptacle 202. To remove the plug 204 from the PCU DC input receptacle 202, the latching clips 310 may be depressed, either by hand or by a suitable tool.

Figure 4:
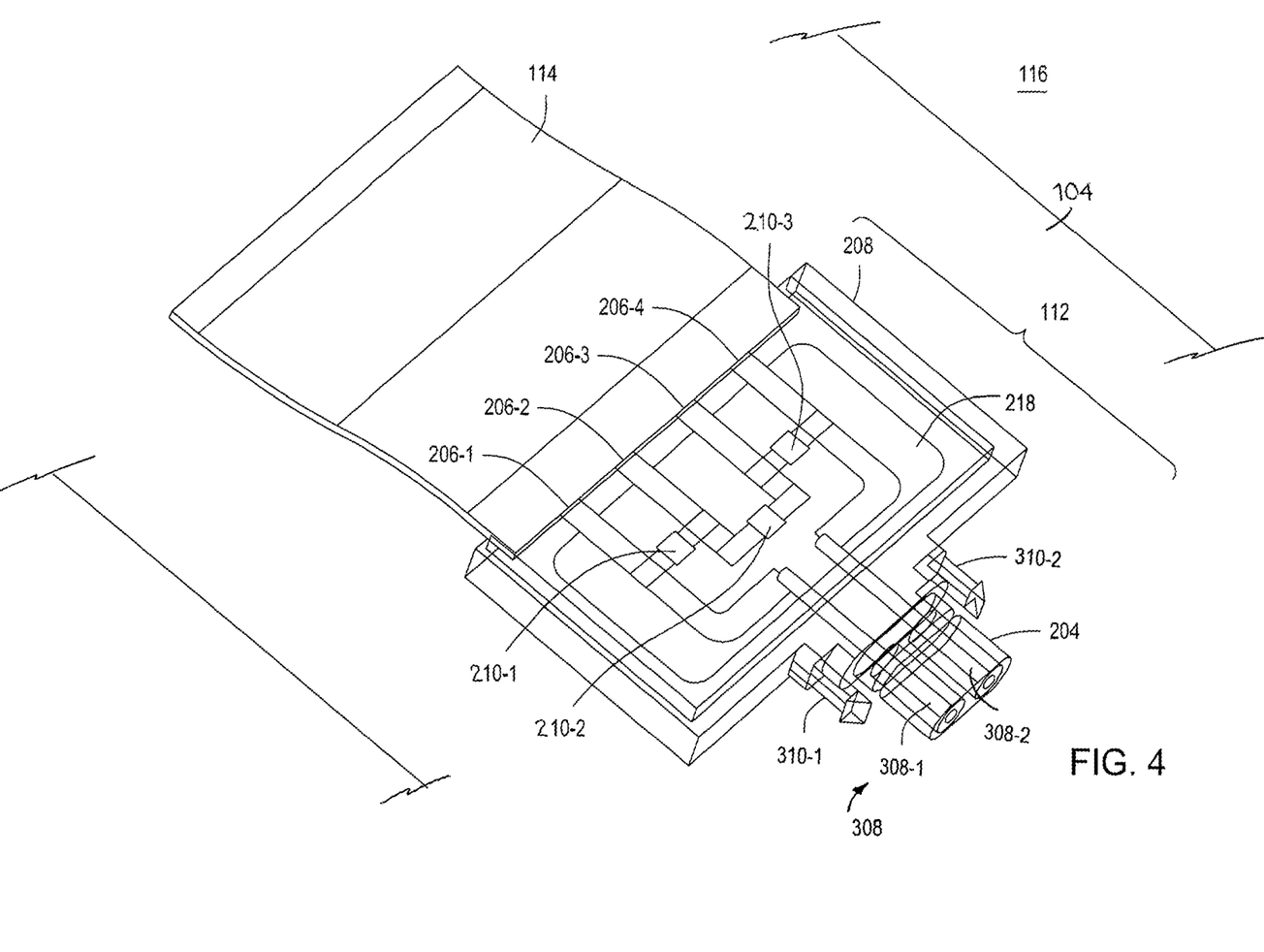
FIG. 4 is a top angled perspective view of another embodiment of a connector assembly.

FIG. 4 is a top angled perspective view of another embodiment of a connector assembly 116. As shown in FIG. 4, the shell of the connector 112 is depicted as transparent in order to more clearly show the internal circuitry for the component.

In the embodiment shown in FIG. 4, the bypass diodes 210 and the heat spreader 218 are located within the connector body 208 rather than within the encapsulated ribbon egress 114. The PV substring interconnects 206 extend from the encapsulated ribbon egress 114 and are coupled within the cavity of the connector body 208 to the bypass diodes 210 as previously described (i.e., the bypass diode 210-1 is coupled between the PV substring interconnects 206-1 and 206-2, the bypass diode 210-2 is coupled between the PV substring interconnects 206-2 and 206-3, and the bypass diode 210-3 is coupled between the PV substring interconnects 206-3 and 206-4). The heat spreader 218 is disposed below and the PV substring interconnects 206/bypass diodes 210 for dissipating heat generated by the bypass diodes 210. The heat spreader 218 is isolated from the PV substring interconnects 206/bypass diodes 210 by a thin strip of material that electrically isolates the heat spreader 218 from the PV substring interconnects 206/bypass diodes 210 (e.g., a backsheet or other insulating polymer, a layer of encapsulation material, an adhesive, or the like). The heat spreader 218 may be co-molded with the plastic connector body 208 (or, alternatively, the heat spreader 218 may be assembled into the connector body 208) and is not exposed on any exterior surface (thereby removing the requirement for grounding).

The PV substring interconnects 206-1 and 206-4 are electrically coupled to the plug pins 308-1 and 308-2, respectively, by any suitable technique, such as by ribbon welding pads (not shown), by crimp-connectors, by direct bonding to the exposed plug pins 308 inside the connector body, or the like. An adhesive or other type of potting material may be dispensed within the cavity of the connector body 208 (i.e., over the PV substring interconnects 206, the bypass diodes 210 and the heat spreader 218) and a connector body cover (not shown), such as a plastic cover, placed over the connector body cavity to fully seal the internal components from external contact and moisture.

In the embodiment shown in FIG. 4, the latching clips 310-1 and 310-2 are disposed one on each side of the connector plug 204, although in other embodiments one or both of the latching clips 310-1 and 310-2 may be in a different position on the connector 112 and/or only a single latching clip 310 may be present.

Figure 5:
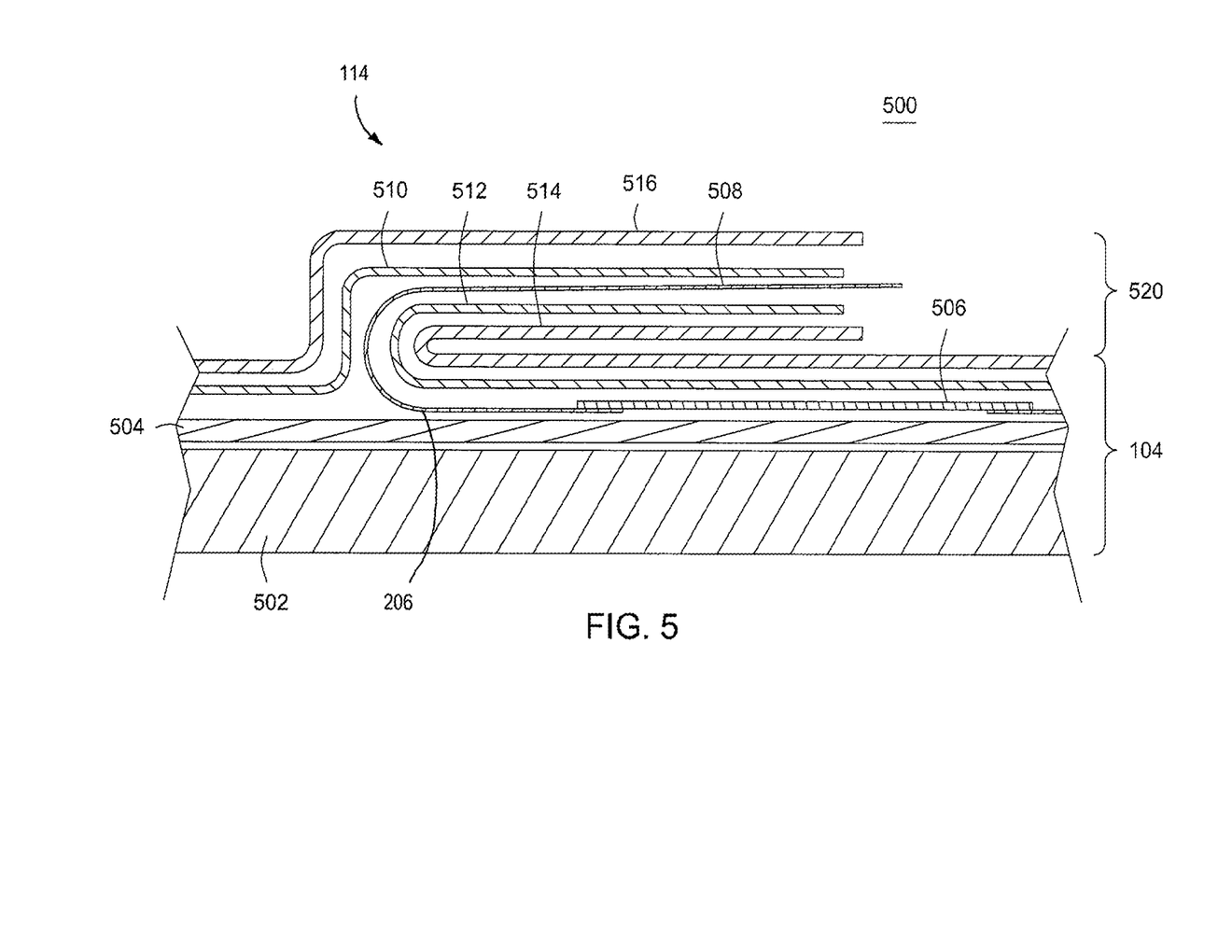
FIG. 5 is a side angled exaggerated perspective view depicting an egress layup for the encapsulated ribbon egress in accordance with one or more embodiments of the present invention.

FIG. 5 is a side angled exaggerated perspective view depicting an egress layup 520 for the encapsulated ribbon egress 114 in accordance with one or more embodiments of the present invention. As shown in FIG. 5, a PV glass front encapsulation sheet 504 is disposed atop a layer of PV glass 502 of the PV module 104, and cell string with ribbons interconnects 506 of the PV module 104 are coupled to the PV substring interconnects 206. Both an egress bottom encapsulation sheet 512 and an egress bottom backsheet 514 are disposed atop the cell string with ribbon interconnects 506/PV substring interconnects 206 and folded in a substantially u-shaped or elbow-type bend (along with the PV substring interconnects 206 between them) at an egress point 522 of the PV module 104. An egress top encapsulation sheet 510 is disposed atop the PV glass front encapsulation sheet 504 to the egress point 522 and then continues atop the folded-back PV substring interconnects 206. An egress top backsheet 516 is disposed atop the egress top encapsulation sheet 510. The egress top and bottom encapsulation sheets 510 and 512, and well as the PV substring interconnects 206, penetrate the PV module 104 such that the resulting encapsulated ribbon egress 114 is integrated with the PV module 104.

During the lamination process, the egress layup 520 is pressed flat to the backsheet of the PV module 104 with a vacuum, thereby removing any trapped air and ensuring a robust seal around the PV substring interconnects 206/cell string with ribbon interconnects 506. The encapsulated ribbon egress 114 may be slightly reshaped after lamination to facilitate mounting of the connector 112, e.g., using a heated platen with a pre-defined shape profile. In one or more alternative embodiments, the connector 112 may be pre-assembled to the PV substring interconnects 206 prior to the layup with the cell string with ribbon interconnects 506 (e.g., a fixture may be used to hold the parts and to create a smooth profile to protect the laminator bladder and improve encapsulation).

As shown in FIG. 5, the encapsulated ribbon egress 114 can be integrated with the PV module 104 during the layup of the encapsulation sheets 504, 510 and 512, the cell string with ribbon interconnects 506, and the top and bottom backsheets 514 and 516 prior to the lamination process for the PV module 104. In one or more embodiments where the PCU 102 is already positioned in an inner region of the PV module 104, the encapsulated ribbon egress 114 can remain relatively flat after lamination and need not be reshaped out of plane after lamination.

The encapsulated ribbon egress 114 is flexible in bending along its length to lift the end off of the backsheet for assembly tooling, and the encapsulation sheets 504, 510 and 512 along with the top and bottom backsheets 514 and 516 disposed on both sides of the encapsulated ribbon egress 114 help to distribute any loads that may be generated if the encapsulated ribbon egress 114 is suddenly pulled or loaded during installation. By integrating the creation of the encapsulated ribbon egress 114 with the lamination process which is already used for PV modules 104, an exceptionally high quality of encapsulation can be realized without a secondary attachment process such as is used for conventional PV junction boxes (e.g., adhesive dispense, mounting j-box, curing adhesive, welding ribbons to j-box terminals, potting the junction box, and the like). Further, the embodiment depicted in FIG. 5 utilizes the same low-cost materials already used for PV cell encapsulation and does not introduce new material systems. The encapsulated ribbon egress 114 enables a significant reduction in both cost and manufacturing overhead as compared to a conventional PV module that requires a junction box. Additionally, integrating the encapsulated ribbon egress 114 with the PV module 104 results in a configuration optimized for applications where PCUs 102 are coupled to PV modules 104 in a one-to-one correspondence.

In some embodiments, a stress-relief feature such as a sleeve, sock or boot, may be slid over the egress layup 520 prior to lamination such that the stress relief feature becomes laminated to the PV module egress to increase robustness. Such a stress-relief feature may be formed from a thicker type of plastic, such as polyvinyl chloride (PVC) plastic. The material for the stress-relief feature is generally more robust as compared to the backsheet material, and in one or more embodiments the stress-relief feature may replace the egress bottom backsheet 514 and the egress top back sheet 516.

In one or more alternative embodiments, the layup may be done such that, rather than the PV substring interconnects 206 being folded back approximately 180°, the PV substring interconnects 206 have a subtle S-jog up and over the 180° folded back egress bottom encapsulation sheet 512/egress bottom backsheet 514.

Figure 6:
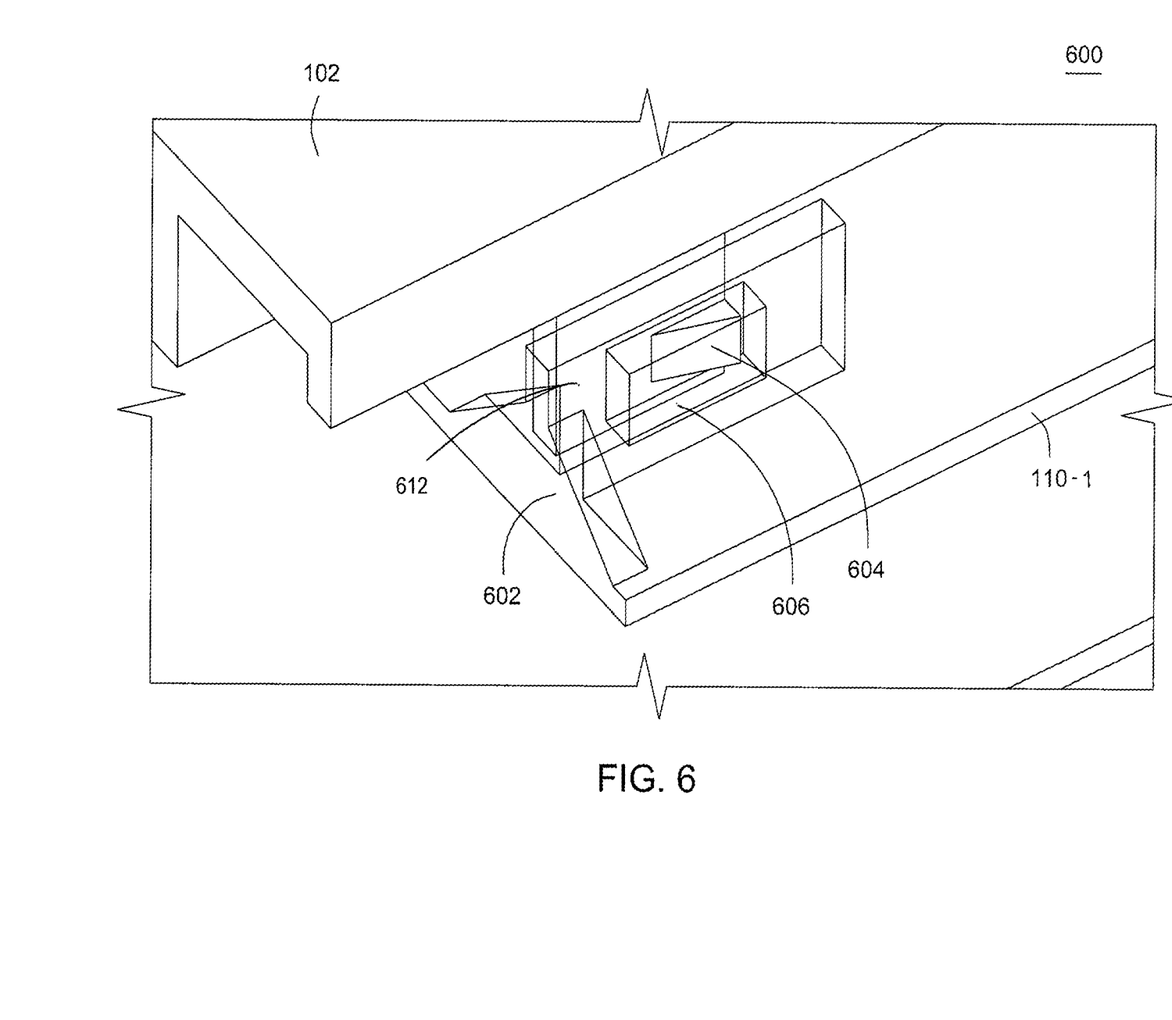
FIG. 6 is a side angled perspective view of a mechanical locking feature of the mounting rails in accordance with one or more embodiments of the present invention.

FIG. 6 is a side angled perspective view of a mechanical locking feature of the mounting rails 110 in accordance with one or more embodiments of the present invention. In FIG. 6, the portion of the mounting rails 110 depicted is shown as transparent in order to more clearly show the features for the component.

The mounting rail pair 110 is a snap-in-place mechanical fixture that retains the PCU 102 with a defined gap between the PCU 102 and the back surface of the PV module 104 for thermal management. The end of one of the mounting rails 110—e.g., mounting rail 110-1—comprises a forward stop protuberance 602 extending vertically from the base of the mounting rail 110-1, e.g. at the end of the base. The forward stop protuberance 602 is sized, shaped and positioned such that when the PCU 102 is inserted and slid between the mounting rails 110, a part 612 of the PCU body, such as an edge, a flange, a tab, or the like, butts against the forward stop protuberance 602 to prevent the PCU 102 from being slid any further forward.

The mounting rail 110-1 additionally defines, proximate the end of the mounting rail 110-1, a spring tab receptacle 606 that is sized, shaped and positioned to receive a corresponding catch-latch mechanical locking feature of the PCU 102, such as a spring tab 604, for removably locking the PCU 102 in proper position between the mounting rails 110. To remove the PCU 102, the spring tab 604 may be depressed (by hand or by a suitable tool) to disengage the spring tab 604 from spring tab receptacle. Although only a portion of the mounting rail 110-1 is shown in FIG. 6, both mounting rails 110 may comprise the forward stop protuberance 602, and one or both of the mounting rails 110 may define additional spring tab receptacles 606 for mating with corresponding catch-latch features of the PCU 102. One or both of the mounting rails 110 may additionally comprise one or more alignment and/or guiding features for ensuring proper alignment of the PCU 102 while the PCU 102 is being inserted between the mounting rails 110.

Figure 7:
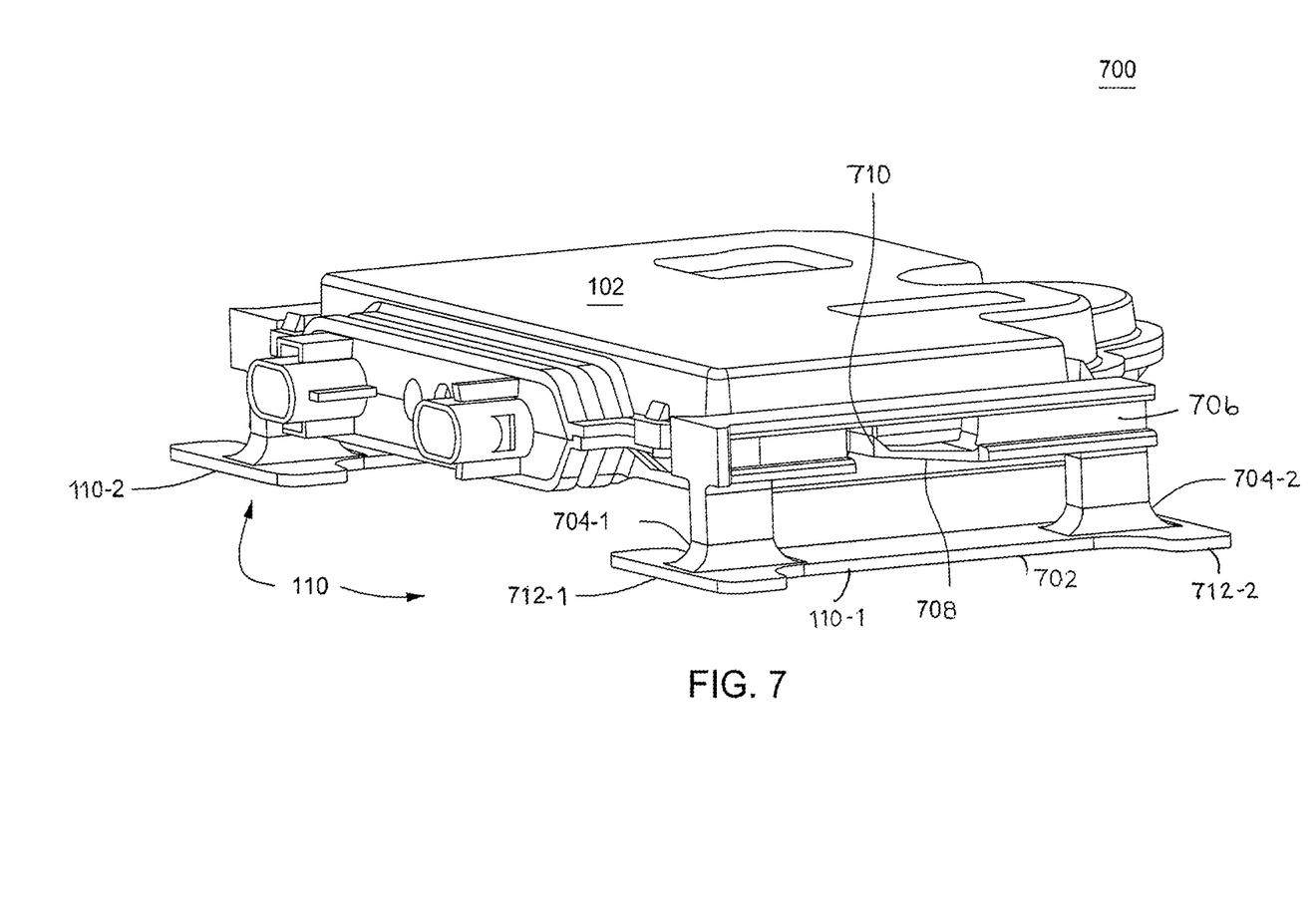
FIG. 7 is a side angled perspective view of another embodiment of a pair of mounting rails.

FIG. 7 is a side angled perspective view of another embodiment of a pair of mounting rails 110. Although only a first mounting rail 110-1 is fully visible in FIG. 7, a second mounting rail 110-2 (partially visible in FIG. 7) is substantially similar to the mounting rail 110-1 and comprises analogous features.

The mounting rail 110-1 is formed from an insulating material, such as PC, PPO™+PS, PPE, NORYL™, LEXAN™, or the like, and comprises an elongated, flat base 702 having a length, width, and thickness for supporting the PCU 102 as described herein. The underside or a portion of the underside of the base 702 is adhered to the rear face of the PV module 104 using a suitable adhesive. In some embodiments, the base 702 comprises feet 712-1 and 712-2 (collectively feet 712), one on each end of the base 702, that are adhered to the PV module 104.

The mounting rail 110-1 further comprises first and second mounting rail posts 704-1 and 704-2 (collectively mounting rail posts 704) disposed vertically from the feet 712-1 and 712-2, respectively, e.g., one mounting rail post 704 at each end of the base 702. The mounting rail posts 704 support a mounting rail arm 706 that is disposed parallel to the base 702. The interior side of the mounting rail arm 706 is suitably formed for receiving the PCU 102 such that the PCU 102 can be slid between the mounting rail arms 706 of each mounting rail 110 and retained. For example, the interior side of each of the mounting rail arms 706 may define a horizontal channel along its length that receives and supports a corresponding ridge, seem, or the like that runs along the sides of the PCU 102. The mounting rail arms 706 maintain the PCU 102 with a defined gap between the PCU 102 and the back surface of the PV module 104 that allows airflow between the PCU 102 and the PV module 10, for thermal management. Additionally, airflow can occur in the space between the mounting rail base 702 and the mounting rail arm 706.

The mounting rails 110 comprise one or more elastic integral snap-fit features that, in combination with corresponding features of the PCU 102, function as catch-latch mechanical locking mechanisms (i.e., snap-fit fasteners) for removably locking the PCU 102 in place between the mounting rails 110. In the embodiment depicted in FIG. 7, the mounting rail 110-1 comprises a spring clip 708 that engages with a notch 710 on the side of the PCU 102 to maintain the PCU 102 in place. The spring clip 708 is disposed substantially in the middle of the mounting rail arm 706, although in other embodiments it may be disposed in a different location of the mounting rail arm 706. As the PCU 102 is slid between the mounting rails 110, the spring clip 708 is depressed by the PCU 102 until the notch 710 reaches the free-moving end of the spring clip 708; the spring clip 708 then retracts such that a flange or protuberance on the free-moving end of the spring clip 708 engages with the notch 710. To remove the PCU 102, the spring clip 708 may be depressed (by hand or by a suitable tool) to disengage the spring clip 708 from the PCU notch 710. In one or more embodiments, the mounting rail 110-1 further comprises one or more features that prevent the spring clip 708 from being depressed to the point of breakage.

In other embodiments, the mounting rails 110 may comprise one or more different and/or additional catch-latch locking mechanisms for locking the PCU 102 in place.

For each mounting rail 110, the two feet 712 on each end of the base 708 are spaced far enough from each other (e.g., on the order of 75 mm such that the PV module 104 can flex between the two points due to only having the thin plastic and adhesive layer—i.e., a curve can exist between the two feet 712. The form factor of the mounting rails 110 is thus such that when the PCU 102 is retained in place between the mounting rails 110, the PV module 104 is able to flex or bow (out of plane) or elongate or shrink (in plane) relative to the mounted components, thereby relieving stress that may otherwise develop due to attached components on the PV module 104.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for presenting a power output from a photovoltaic (PV) module comprising:
   a connector assembly comprising:
      an encapsulated ribbon egress, integrated with the PV module and extending from the PV module to a connector, comprising a plurality of PV module substring interconnects electrically coupled to a plurality of PV cells of the PV module and extending from the PV module; and
      the connector, having a two-pole DC connector plug comprising a two-pole DC electrical output that is electrically coupled to the plurality of PV module substring interconnects, wherein the encapsulated ribbon egress is laminated as part of the PV module backsheet such that a portion of the PV module backsheet extends from the PV module and covers the plurality of PV module substring interconnects.

2. The apparatus of claim 1, wherein the encapsulated ribbon egress further comprises a plurality of bypass diodes coupled to the plurality of PV module substring interconnects such that reverse current flow to the PV module is prevented.

3. The apparatus of claim 2, wherein the encapsulated ribbon egress further comprises a heat spreader coupled to the plurality of bypass diodes for dissipating generated heat.

4. The apparatus of claim 2, wherein a plurality of thermally conductive foils is coupled to the plurality of bypass diodes.

5. The apparatus of claim 1, wherein the connector further comprises a plurality of bypass diodes coupled to the plurality of PV module substring interconnects such that reverse current flow to the PV module is prevented.

6. The apparatus of claim 5, wherein the connector further comprises a heat spreader coupled to the plurality of bypass diodes for dissipating generated heat.

7. The apparatus of claim 1, further comprising a stress-relief feature laminated around the encapsulated ribbon egress.

8. The apparatus of claim 1, wherein the two-pole DC electrical output is a two-pole DC electrical plug that is adapted for mating with a power conditioning unit (PCU).

9. The apparatus of claim 8, wherein the PCU is a DC-DC converter.

10. The apparatus of claim 8, wherein the PCU is a DC-AC inverter.

11. The apparatus of claim 1, further comprising a pair of mounting rails adapted for being mechanically coupled to the PV module and retaining a power conditioning unit (PCU) with a defined gap between the PCU and the PV module, wherein electrically connectivity between the PV module and the PCU and mechanical connectivity between the PV module and the PCU are decoupled from one another.

12. The apparatus of claim 11, wherein the pair of mounting rails comprises at least one snap-fitting mechanical locking mechanism for removably coupling the PCU to the pair of mounting rails.

13. A system for coupling power output from a photovoltaic (PV) module comprising:
the photovoltaic (PV) module;
a connector assembly comprising (i) an encapsulated ribbon egress, integrated with the PV module and extending from the PV module to a connector, comprising a plurality of PV module substring interconnects electrically coupled to a plurality of PV cells of the PV module and extending from the PV module, and (ii) the connector, having a two-pole DC connector plug comprising a two-pole DC electrical output that is electrically coupled to the plurality of PV module substring interconnects, wherein the encapsulated ribbon egress is laminated as part of the PV module backsheet such that a portion of the PV module backsheet extends from the PV module and covers the plurality of PV module substring interconnects;
a power conditioning unit (PCU) electrically coupled to the two-pole DC electrical output; and
a pair of mounting rails mechanically coupled to the PV module and retaining the PCU with a defined gap between the PCU and the PV module, wherein electrically connectivity between the PV module and the PCU and mechanical connectivity between the PV module and the PCU are decoupled from one another.

14. The system of claim 13, wherein the encapsulated ribbon egress further comprises a plurality of bypass diodes coupled to the plurality of PV module substring interconnects such that reverse current flow to the PV module is prevented.

15. The system of claim 14, wherein the encapsulated ribbon egress further comprises a heat spreader coupled to the plurality of bypass diodes for dissipating generated heat.

16. The system of claim 13, wherein the connector further comprises a plurality of bypass diodes coupled to the plurality of PV module substring interconnects such that reverse current flow to the PV module is prevented.

17. The system of claim 16, wherein the connector further comprises a heat spreader coupled to the plurality of bypass diodes for dissipating generated heat.

18. The system of claim 13, further comprising a stress-relief feature laminated around the encapsulated ribbon egress.

19. The system of claim 13, wherein the PCU is a DC-DC converter.

20. The system of claim 13, wherein the PCU is a DC-AC inverter.

* * * * *